(12) United States Patent
Toyoda et al.

(10) Patent No.: US 9,884,442 B2
(45) Date of Patent: Feb. 6, 2018

(54) PREFORM INJECTION MOLDING DEVICE

(71) Applicants: Tamotsu Toyoda, Tokyo (JP); Hiroshi Hosokoshiyama, Tokyo (JP); Mamoru Sato, Tokyo (JP); Yasuhiro Ishizawa, Tokyo (JP)

(72) Inventors: Tamotsu Toyoda, Tokyo (JP); Hiroshi Hosokoshiyama, Tokyo (JP); Mamoru Sato, Tokyo (JP); Yasuhiro Ishizawa, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 197 days.

(21) Appl. No.: 14/897,013

(22) PCT Filed: May 15, 2014

(86) PCT No.: PCT/JP2014/002566
§ 371 (c)(1),
(2) Date: Dec. 9, 2015

(87) PCT Pub. No.: WO2014/207986
PCT Pub. Date: Dec. 31, 2014

(65) Prior Publication Data
US 2016/0114505 A1    Apr. 28, 2016

(30) Foreign Application Priority Data

Jun. 28, 2013 (JP) ................................. 2013-137102
Jun. 28, 2013 (JP) ................................. 2013-137105
Jun. 28, 2013 (JP) ................................. 2013-137108

(51) Int. Cl.
*B29C 45/16*     (2006.01)
*B29B 11/08*     (2006.01)
(Continued)

(52) U.S. Cl.
CPC .......... *B29C 45/1603* (2013.01); *B29B 11/08* (2013.01); *B29C 49/22* (2013.01);
(Continued)

(58) Field of Classification Search
CPC ............ B29C 45/1603; B29C 45/1646; B29C 2045/1614
See application file for complete search history.

(56) References Cited

U.S. PATENT DOCUMENTS

| 8,607,999 B2 | 12/2013 | Toyoda et al. |
| 2011/0108505 A1 | 5/2011 | Toyoda et al. |
| 2011/0155686 A1 | 6/2011 | Maki et al. |

FOREIGN PATENT DOCUMENTS

| CN | 101801641 A | 8/2010 |
| CN | 103379987 A | 10/2013 |

(Continued)

OTHER PUBLICATIONS

Dec. 13, 2016 Office Action issued in Japanese Patent Application No. 2013-137102.
(Continued)

*Primary Examiner* — Jill L Heitbrink
(74) *Attorney, Agent, or Firm* — Oliff PLC

(57) ABSTRACT

An injection molding device including a middle flow channel which forms an intermediate layer of a preform which is subject to biaxial stretch blow molding. The middle flow channel s segmented into a predetermined number of flow sub-channels by vertical blocking rib piece(s). Side wall's upstream portions of the vertical blocking rib piece are formed as angled surfaces whose distance from each other decreases from the downstream side to the upstream side, and/or, an end portion of the vertical blocking rib piece that is located on the downstream side is tucked in at least one of the inner flow channel and the outer flow channel.

7 Claims, 10 Drawing Sheets

(51) Int. Cl.
*B29C 49/22* (2006.01)
*B29K 105/00* (2006.01)
*B29K 67/00* (2006.01)

(52) U.S. Cl.
CPC ............... *B29B 2911/14073* (2013.01); *B29B 2911/14086* (2013.01); *B29B 2911/14446* (2013.01); *B29C 45/1646* (2013.01); *B29C 2045/1614* (2013.01); *B29K 2067/003* (2013.01); *B29K 2105/258* (2013.01); *B29K 2827/18* (2013.01); *B29K 2905/12* (2013.01); *B29K 2909/04* (2013.01); *B29K 2995/0067* (2013.01); *B29K 2995/0069* (2013.01)

(56) References Cited

FOREIGN PATENT DOCUMENTS

| | | |
|---|---|---|
| JP | S58-136317 U | 9/1983 |
| JP | 62-35818 * | 2/1987 |
| JP | H01-254539 A | 10/1989 |
| JP | H0970863 A | 3/1997 |
| JP | H09277307 A | 10/1997 |
| JP | 2002-301746 A | 10/2002 |
| JP | 2003236886 A | 8/2003 |
| JP | 2008-265188 A | 11/2008 |
| JP | 2010-012605 A | 1/2010 |
| JP | 2010-012606 A | 1/2010 |
| JP | 2013-095035 A | 5/2013 |
| WO | 2011/006999 A1 | 1/2011 |
| WO | 2013/065501 A1 | 5/2013 |

OTHER PUBLICATIONS

Jan. 30, 2017 Search Report issued in European Patent Application No. 14818511.9.
Apr. 14, 2017 Office Action issued in Korean Patent Application No. 10-2015-7033899.
Aug. 1, 2016 Office Action issued in Chinese Patent Application No. 201480031703.9.
Jul. 22, 2014 International Search Report issued in International Patent Application No. PCT/JP2014/002566.
Sep. 6, 2016 Office Action issued in Japanese Patent Application No. 2013-137102.

* cited by examiner

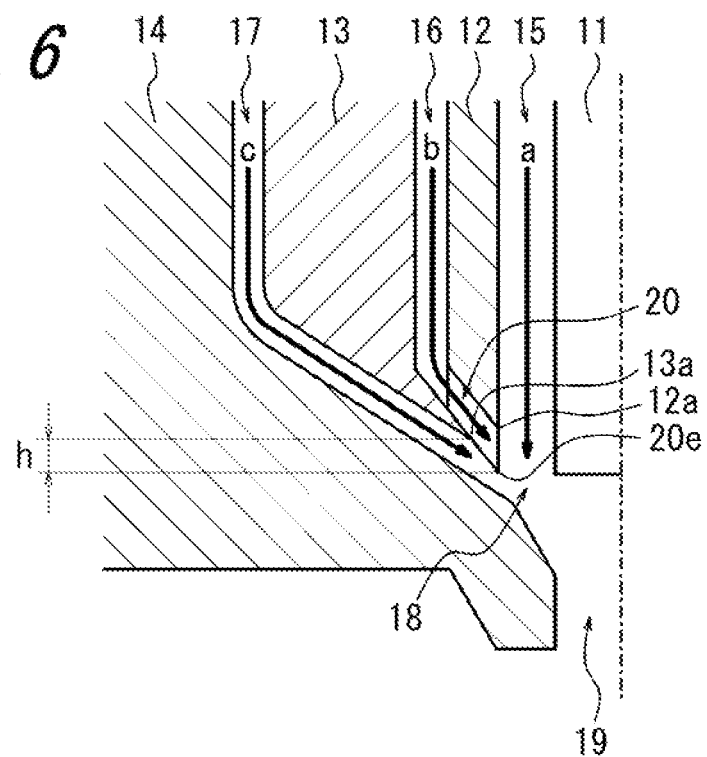
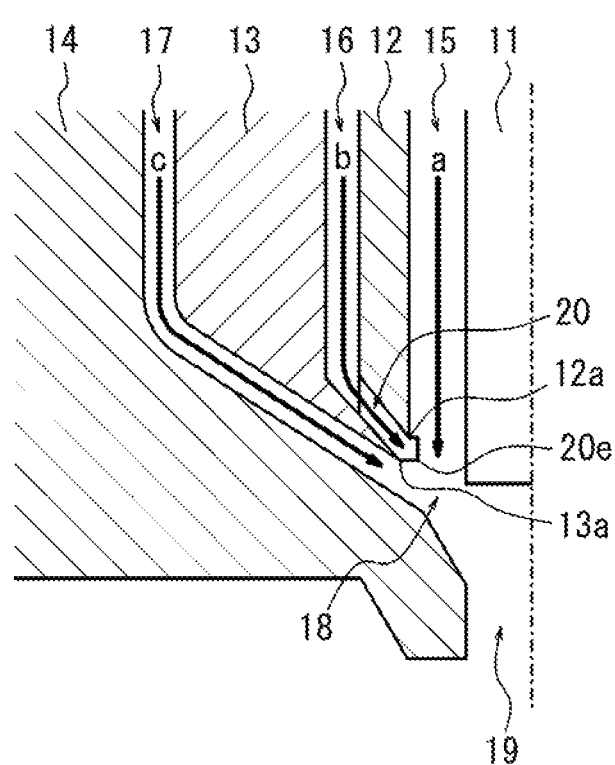

A-A section

B-B section

US 9,884,442 B2

PREFORM INJECTION MOLDING DEVICE

TECHNICAL FIELD

The present disclosure relates to a device for injection molding a preform subject to biaxial stretch blow molding, and especially to a nozzle used in a device for injection molding a preform in which an intermediate layer made of an intermediate-layer resin is laminated between substrate layers made of a main resin.

BACKGROUND

Biaxially stretched blow molded bottles made of Polyethylene Terephthalate (hereinafter, abbreviated as PET) are used in various fields, such as beverages, foods, cosmetics, and so forth. Especially, bottles for use in applications demanding a gas barrier property are made by laminating an intermediate layer made of a gas barrier resin, such as a nylon-based resin and an ethylene-vinyl alcohol copolymer, with substrate layers made of a PET resin as the main resin, in a manner such that the intermediate layer is embedded therebetween. Patent Literature 1 describes a process of molding a laminated preform, which is a primary molded product used in biaxial stretch blow molding of a laminated bottle in which an intermediate layer made of a nylon resin is laminated between substrate layers made of a PET resin.

In such biaxially stretched blow molded bottles, although the substrate layers are in tight contact with the intermediate layer, these two layers are in many cases not adhered to each other due to a difference in the materials. Accordingly, the two layers might be partially delaminated under the action of shearing force caused by an impact of dropping or the like. Once the partial delamination as described above occurs in the layers of a bottle used for, for example, a carbonated drink, carbon dioxide gas permeates an inner layer of the PET resin and enters the delaminated portion. The resulting pressure of carbon dioxide gas further exacerbates the delamination until the delamination is visible in external appearance when light is scattered or reflected from the delaminated interface, which ruins the appearance.

In this connection, the present inventors have proposed in Patent Literature 2 a laminated bottle by which the aforementioned problem of delamination in a bottle including an intermediate layer is solved. In detail, FIGS. 10A and 10B illustrate an exemplary bottle 201 according to Patent Literature 2, which includes a neck 202, a neck ring 203, a shoulder 204, a cylindrical body 205, and a bottom 206 having a "petaloid" shape with a plurality of extended feet. In the illustrated example, in a predetermined range extending from right below a lower end of the neck ring 203 to right above an upper end portion of the bottom 206, the bottle 201 has a laminar structure including an intermediate layer 213 (in a cross-hatched pattern) sandwiched between substrate layers 211, i.e., an outer layer 211a and an inner layer 211b. Furthermore, the intermediate layer 213 is segmented in the circumferential direction by vertical connecting zones 214 in which the outer layer 211a and the inner layer 211b are connected. According to the laminated bottle with the above structure, even when an impact due to dropping or the like causes the delamination in one of strips of the intermediate layer, the vertical connecting zones prevent progress of the delamination to adjacent strips. Restricting occurrence of the delamination to the limited strip allows the bottle to maintain its fine appearance and transparency.

CITATION LIST

Patent Literatures

PTL1: JPH01254539A
PTL2: JP2013095035A

In Patent Literature 2, the present inventors have also proposed a preform subject to biaxial stretch blow molding to be molded into the aforementioned laminated bottle and a device for injection molding the preform. In detail, FIG. 11 illustrates an exemplary preform 101 including a neck 102, a neck ring 103, a cylindrical body 105, and a bottom 106. In a predetermined range extending right below a lower end of the neck ring 103 to an upper end of the bottom 106, the preform 101 has a laminar structure including an intermediate layer 113 (in a cross-hatched pattern) sandwiched between substrate layers, i.e., an outer layer 111a and an inner layer 111b. Furthermore, the intermediate layer 113 is segmented in the circumferential direction by vertical connecting zones 114 in which the outer layer 111a and the inner layer 111b are connected.

FIG. 12 illustrates an exemplary injection molding device including a nozzle section 311 through which molten resins are injected to a mold 301 used to form the preform 101. The nozzle section 311 as a whole has three layer-forming flow channels: an inner flow channel 315 (having a cylindrical region that is adjacent to a shut-off pin 320 and a columnar region that is above a tip of the shut-off pin 320) through which the main resin used to form the inner layer 111b of the preform 101 flows; an outer flow channel 317 (having a cylindrical shape) through which the main resin used to form the outer layer 111a of the preform 101 flows; and a middle flow channel 316 (having a cylindrical shape) through which the intermediate layer resin used to form the intermediate layer 113 flows. The three flow channels are formed by a combination of the shut-off pin 320, an inner ring mandrel 324c, a middle ring mandrel 324d, and an outer ring mandrel 324e. As illustrated in FIGS. 13 to 15, the middle flow channel 316 is segmented into the predetermined number of flow sub-channels by vertical blocking rib pieces 316R disposed in the circumferential direction at an interval in a lower end (tip) portion of the inner ring mandrel 324c. After being segmented in the circumferential direction in the middle flow channel 316, the intermediate layer resin flows into a confluence 318 where the intermediate layer resin joins and runs between the main resin from the inner flow channel 315 and the main resin from the outer flow channel 317. Then, the resins flow into a joined flow channel 319 to form a multi-layer molten resin fluid including the intermediate layer resin laminated between the layers of the main resin coaxially. The multi-layer molten resin fluid is injected into a cavity of the mold 301. With the above structure, the injection molding device is capable of molding the preform 101 including the outer layer 111a, the inner layer 111b, the intermediate layer 113, and the vertical connecting zones 114.

SUMMARY

Technical Problems

Meanwhile, during use of the aforementioned injection molding device, since the middle flow channel 316 is segmented into the small streams by the vertical blocking rib pieces 316R and since the flow of the corresponding molten resin is inevitably interrupted under the effect of the vertical blocking rib pieces 316R, the molten resin sometimes partially remains in the flow channel. When, in this situation, molding is conducted successively, the temperature of the built-up resin might increase, resulting in resin burning (carbonization). The carbonized resin might get mixed in the preform as impurities. Furthermore, when adhering to side walls of the vertical blocking rib pieces 316R or onto a wall surface of the lower end portion of the inner ring mandrel 324c, the carbonized resin narrows the middle flow channel 316. In this case, the width and thickness of the intermediate layer 113 is reduced than the predetermined dimension or, the resulting intermediate layer 113 might be partially missing, and accordingly, barrier properties of the resulting laminated bottle might be impaired. Especially, any gas barrier resin, such as a nylon-based resin and an ethylene-vinyl alcohol copolymer, is prone to resin burning due to built-up and cause the troubles.

Moreover, at the confluence 318 in the nozzle section 311, flow of each molten resin changes depending on the rate of another molten resin that has passed through a different channel and on differences on directions of the resins flowing into the confluence 318. Accordingly, the main resin might affect and greatly change the streams of the intermediate layer resin into which the intermediate layer resin has been segmented by the vertical blocking rib pieces 316R, possibly resulting in changes in the shapes (width, thickness, and the like) of the intermediate layer 113 and vertical connecting zones 114 beyond an allowable tolerance.

The present disclosure is to solve the above problems, and the present disclosure is to provide an improved injection molding device that is capable of forming the intermediate layer and the vertical connecting zones of the preform into desired shapes and dimensions.

Solution to Problems

One of aspects of the present disclosure resides in an injection molding device that injection molds a preform which is subjected to biaxial stretch blow molding and which includes at least one intermediate layer laminated between substrate layers. The injection molding device includes a nozzle section through which a main resin used to form the substrate layers and an intermediate layer resin used to form the intermediate layer are injected.

The nozzle section includes at least three cylindrical layer-forming flow channels disposed coaxially, the three cylindrical layer-forming flow channels including an inner flow channel and an outer flow channel, which are used to form the substrate layers each made of the main resin, and a middle flow channel, which is located between the inner flow channel and the outer flow channel and is used to form the intermediate layer made of the intermediate layer resin.

The middle flow channel is segmented into a predetermined number of flow sub-channels by at least one vertical blocking rib piece disposed transversely within the middle flow channel on a downstream side thereof.

Herein, (i) the vertical blocking rib piece has a pair of side walls located on both sides of the vertical blocking rib piece in a circumferential direction, and the pair of side walls each include a side wall's upstream portion located on an upstream side, the side wall's upstream portions being formed as angled surfaces whose distance from each other decreases from the downstream side to the upstream side, and/or (ii) an end portion of the vertical blocking rib piece that is located on the downstream side is tucked in at least one of the inner flow channel and the outer flow channel.

In the injection molding device according to one of preferred embodiments, the at least one vertical blocking rib piece includes a plurality of vertical blocking rib pieces, and the pair of side walls each further include a side wall's downstream portion located on the downstream side, and a side clearance between the side wall's downstream portions included in any two adjacent vertical blocking rib pieces is constant from the upstream side to the downstream side.

In the injection molding device according to another preferred embodiment, the end portion of the vertical blocking rib piece that is located on the downstream side is tucked at least in the outer flow channel.

In the injection molding device according to yet another preferred embodiment, (i) the vertical blocking rib piece has the pair of side walls located on both sides of the vertical blocking rib piece in the circumferential direction, and the pair of side walls each include the side wall's upstream portion located on the upstream side, the side wall's upstream portions being formed as angled surfaces whose distance from each other decreases from the downstream side to the upstream side, and (ii) the end portion of the vertical blocking rib piece that is located on the downstream side is tucked in at least one of the inner flow channel and the outer flow channel.

In the injection molding device according to yet another preferred embodiment, the nozzle section includes an inner ring mandrel including inside thereof the inner flow channel, a middle ring mandrel surrounding the inner ring mandrel and including the middle flow channel between the middle ring mandrel and the inner ring mandrel, and an outer ring mandrel surrounding the middle ring mandrel and including the outer flow channel between the outer ring mandrel and the middle ring mandrel, and at least the inner ring mandrel is coated with a repellency-enhancing film.

In the injection molding device according to yet another preferred embodiment, the film applied to the inner ring mandrel includes a titanium nitride (TiN) film or a NiP/PTFE film containing nickel phosphide (NiP) and polytetrafluoroethylene (PTFE).

In the injection molding device according to yet another preferred embodiment, a base material of the inner ring mandrel includes stainless.

Advantageous Effects

When the vertical blocking rib piece herein has the pair of side walls located on both sides of the vertical blocking rib piece in the circumferential direction, and the pair of side walls each include the side wall's upstream portion located on the upstream side, the side wall's upstream portions being formed as angled surfaces whose distance from each other decreases from the downstream side to the upstream side, flow of the intermediate layer resin is prevented from being interrupted by the vertical blocking rib piece. Furthermore, when the end portion of the vertical blocking rib piece that is located on the downstream side is tucked in at least one of the inner flow channel and the outer flow channel, a change in flow of the intermediate layer resin is limited even after the intermediate layer resin has joined with the main resin. Thus, according to the present disclosure, flow of the intermediate layer resin is stabilized, and accordingly, the intermediate layer and the vertical connecting zones are formed into desired shapes and dimensions.

BRIEF DESCRIPTION OF THE DRAWINGS

In the accompanying drawings:

FIG. 6 is a partially enlarged sectional view schematically illustrating a periphery of a nozzle section of an injection molding device according to the second embodiment of the present disclosure;

FIG. 7 is a partially enlarged sectional view illustrating a periphery of a nozzle section according to a modified example of the second embodiment of FIG. 6;

DETAILED DESCRIPTION

Figure 1:
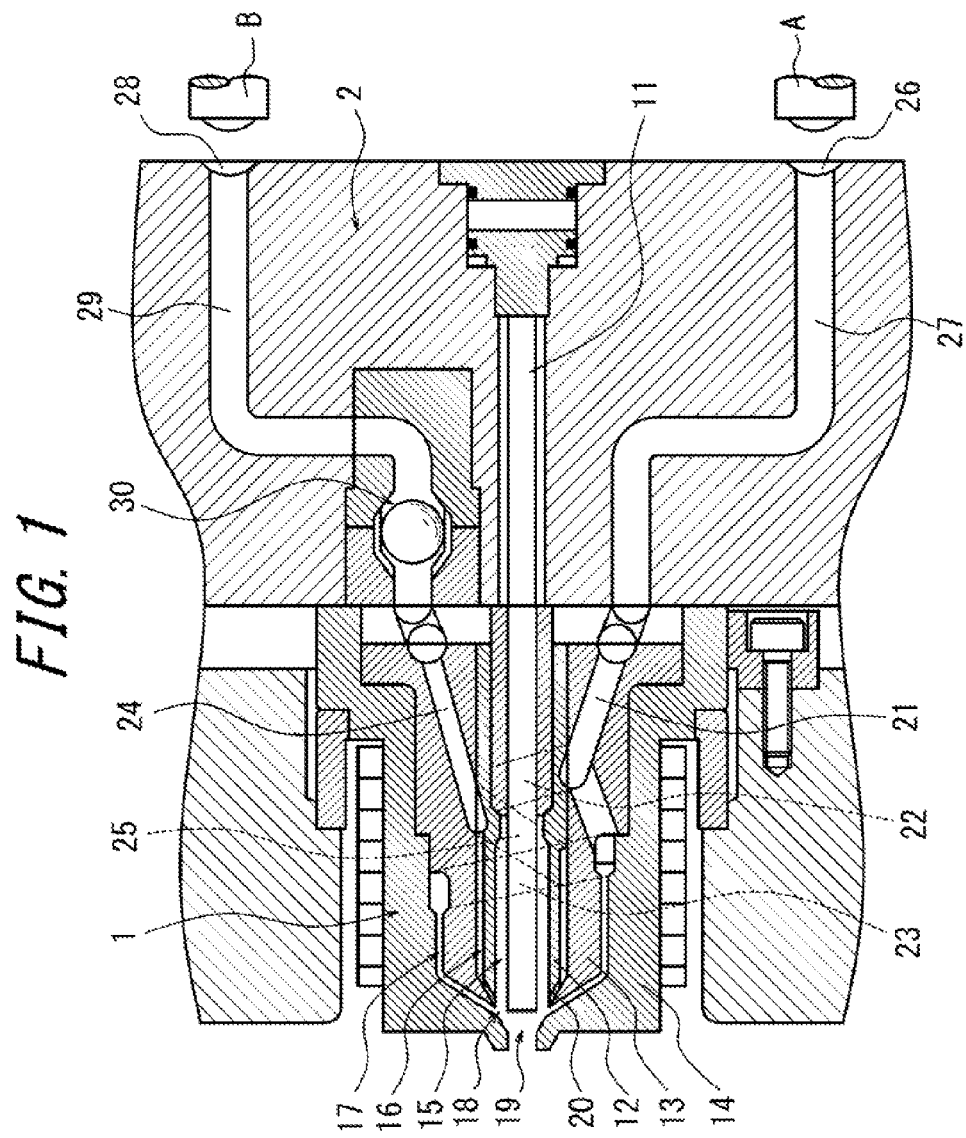
FIG. 1 is a sectional view schematically illustrating an injection molding device according to the first embodiment of the present disclosure.
Figure 2:
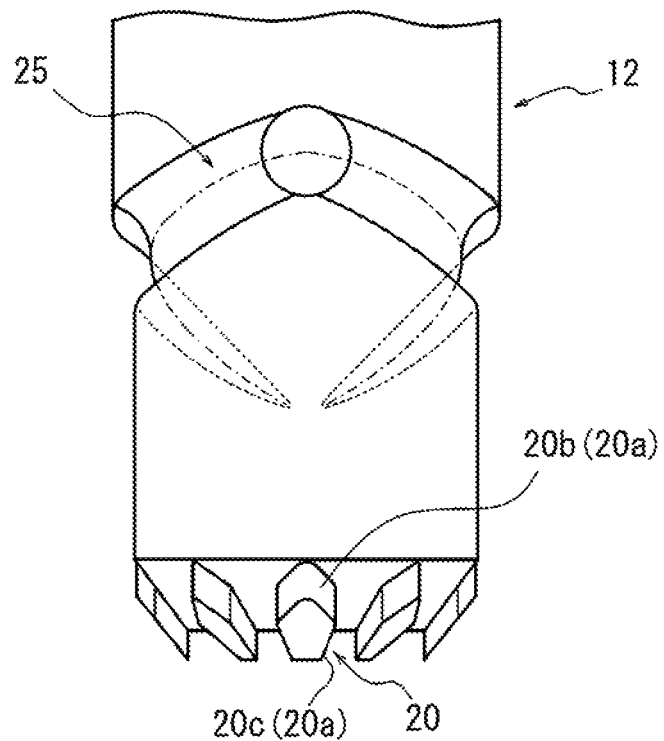
FIG. 2 is a front view illustrating an inner ring mandrel used in the injection molding device of FIG. 1.
Figure 3:
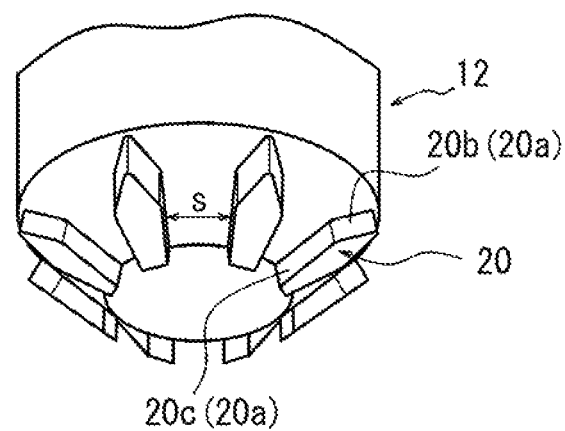
FIG. 3 is a perspective view illustrating the inner ring mandrel of FIG. 2 as viewed from a downstream side.
Figure 4:
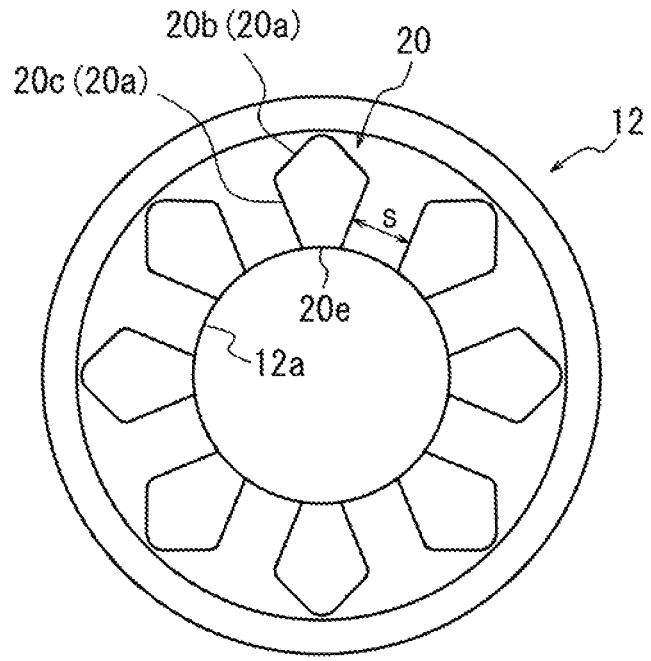
FIG. 4 is a bottom view illustrating the inner ring mandrel of FIG. 2 as viewed from the downstream side.

The following describes an injection molding device according to preferred embodiments of the present disclosure in detail with reference to the drawings. FIG. 1 is a sectional view schematically illustrating an injection molding device according to the first embodiment of the present disclosure, FIG. 2 is a front view illustrating an inner ring mandrel used in the injection molding device of FIG. 1, FIG. 3 is a perspective view illustrating the inner ring mandrel of FIG. 2 as viewed from a downstream side, and FIG. 4 is a bottom view illustrating the inner ring mandrel of FIG. 2 as viewed from the downstream side.

Figure 12:
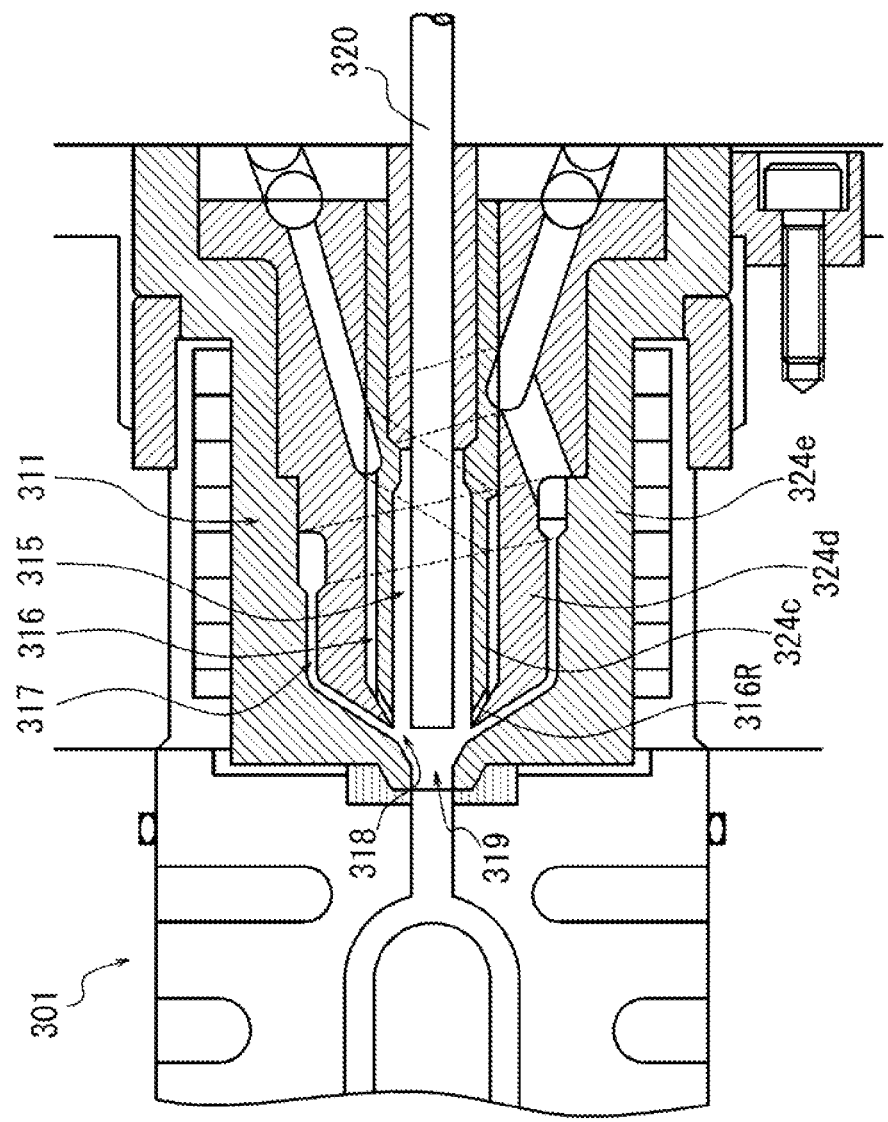
FIG. 12 is a sectional view illustrating an exemplary device for injection molding the preform of FIGS. 11A and 11B.
Figure 13:
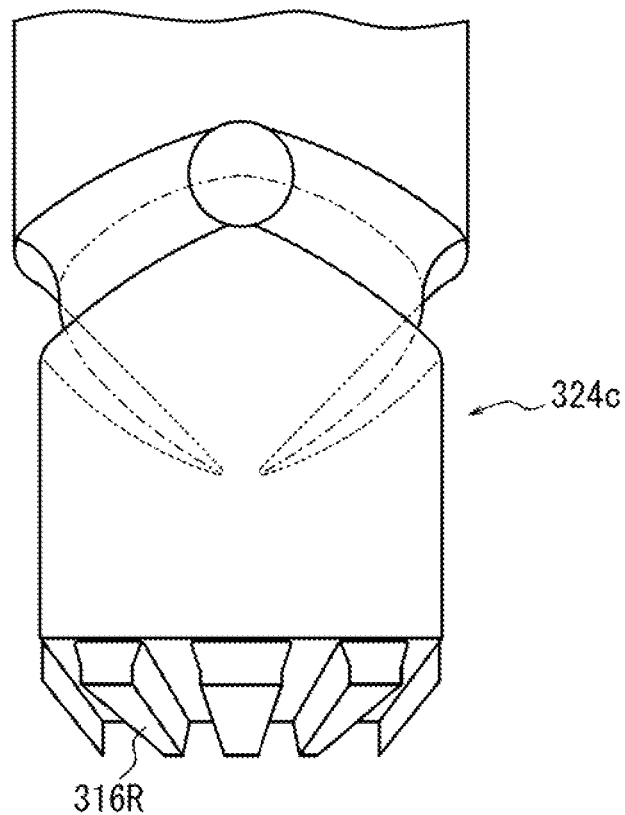
FIG. 13 is a front view illustrating an inner ring mandrel used in the injection molding device of FIG. 12.
Figure 14:
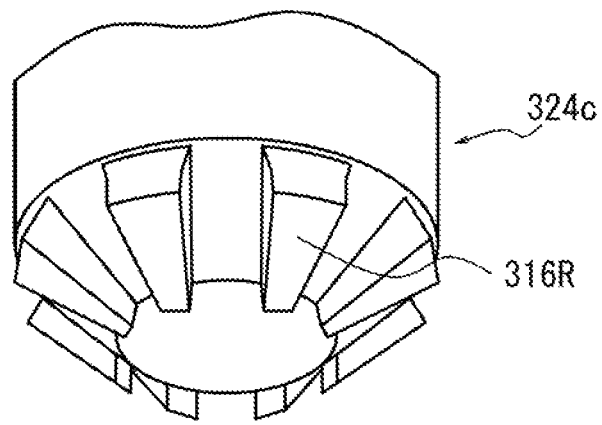
FIG. 14 is a perspective view illustrating the inner ring mandrel of FIG. 13 as viewed from a downstream side.
Figure 15:
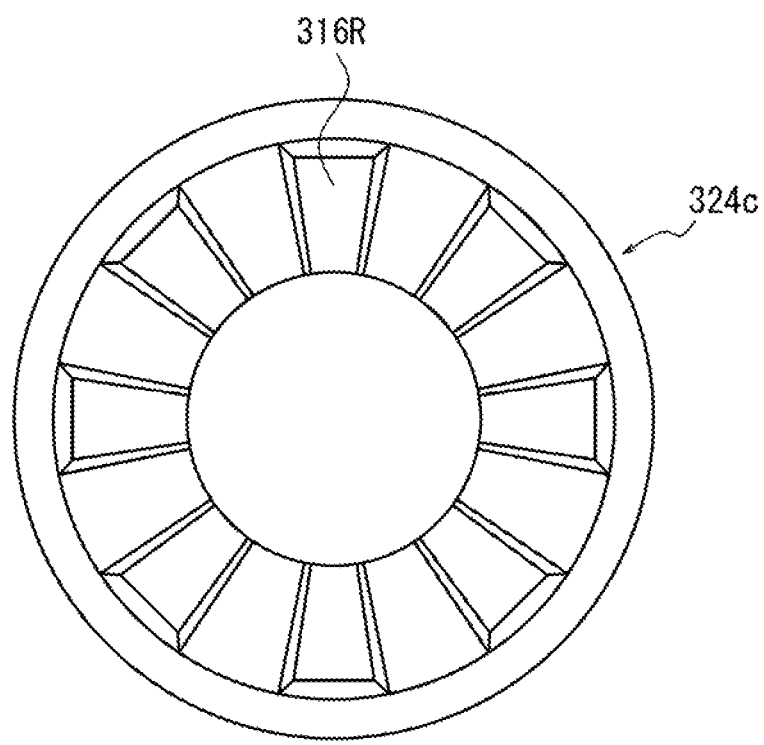
FIG. 15 is a bottom view illustrating the inner ring mandrel of FIG. 13 as viewed from the downstream side.

In FIG. 1, reference numeral 1 denotes a nozzle section, which is a component of the injection molding device, and reference 2 denotes a hot runner block mounted on an upstream side of the nozzle section 1. Reference numerals A and B denote resin supply units configured to separately supply two different types of resins (i.e., a main resin and an intermediate layer resin) in their molten states. Although not illustrated, as a mold used to mold a preform, the one similar to a mold 301 illustrated in FIG. 12 is fixed to the downstream side of the nozzle section 1.

The nozzle section 1 includes a cylindrical shut-off pin 11 disposed at center and also includes an inner ring mandrel 12, a middle ring mandrel 13, and an outer ring mandrel 14 that have a cylindrical shape and are disposed in this order coaxially about the shut-off pin 11. With the above structure, three layer-forming flow channels are formed in total. That is to say, a cylindrical inner flow channel 15 (which is also columnar in a region thereof that is above a tip of the shut-off pin 11) for flow of the main resin used to form an inner layer of the preform is formed between the shut-off pin 11 and the inner ring mandrel 12. A cylindrical middle flow channel 16 for flow of the intermediate layer resin used to form an intermediate layer of the preform is also formed between the inner ring mandrel 12 and the middle ring mandrel 13. An outer flow channel 17 for flow of the main resin used to form an outer layer of the preform is also formed between the middle ring mandrel 13 and the outer ring mandrel 14.

The middle flow channel 16 and the outer flow channel 17 have end portions on the downstream side where these channels are reduced in diameter to form a tapered cylindrical channel portion. Further downstream of the tapered cylindrical channel portion, a cylindrical joining flow channel 19 is formed, via a confluence 18 where the resins having passed the layer-forming flow channels join together.

In the tapered cylindrical channel portion, vertical blocking rib pieces 20 are disposed transversely within the middle flow channel 16 to segment the middle flow channel 16 into the same number of flow sub-channels as the number of the vertical blocking rib pieces 20. In the present embodiment, as illustrated in FIGS. 2 to 4, a total of eight vertical blocking rib pieces 20 are disposed at an equal interval in the circumferential direction in a tapered portion of the inner ring mandrel 12, i.e., in the end portion on the downstream side of the middle flow channel 16.

Herein, as illustrated in FIG. 4, each vertical blocking rib piece 20 has a pair of side walls 20a located on both sides of the vertical blocking rib piece 20 in the circumferential direction, and the pair of side walls 20a each include a side wall's upstream portion 20b located on the upstream side of the middle flow channel 16 (i.e., on the outer side of the inner ring mandrel 12 in the radial direction). These side wall's upstream portions 20b are formed as angled surfaces whose distance from each other decreases from the downstream side to the upstream side of the middle flow channel 16 (i.e., from the inner side to the outer side of the inner ring mandrel 12 in the radial direction).

Furthermore, the pair of side walls 20a in the vertical blocking rib piece 20 each include a side wall's down stream portion 20c located on the downstream side of the middle flow channel 16 (i.e., on the inner side of the inner ring mandrel 12 in the radial direction). A side clearance s between the side wall's downstream portions 20c included in any two adjacent vertical blocking rib pieces 20 is constant from the upstream side to the downstream side (i.e., from the outer side to the inner side of the inner ring mandrel 12 in the radial direction).

As illustrated in FIG. 1, further upstream of the three layer-forming flow channels, there are formed flow channels through which the molten resins flow from the hot runner block 2. In the present embodiment, two manifolds 22 and 23 communicating with an introduction channel 21 are in communication with the inner flow channel 15 and the outer flow channel 17, respectively. In addition to the introduction channel 21, an introduction channel 24 is also formed in communication with the middle flow channel 16 through the manifold 25.

On the other hand, the hot runner block 2 mounted on the upstream side of the nozzle section 1 is provided with a supply port 26 for introduction of the main resin that has been supplied from the resin supply unit A and a hot runner 27 connecting the supply port 26 and the aforementioned introduction channel 21. The hot runner block 2 is further provided with a supply port 28 for introduction of the intermediate layer resin that has been supplied from the resin supply unit B and a hot runner 29 connecting the supply port 28 and the aforementioned introduction channel 24. Further downstream of the hot runner 29, there is also provided a check valve 30 having a backflow prevention function using a ball valve to start and stop supply of the intermediate layer resin immediately with high precision. Additionally, the check valve 30 may also be provided in the nozzle section 1.

To mold a preform with use of the injection molding device structured as above, one may introduce the molten main resin to the supply port 26 from the resin supply unit A and introduce the molten intermediate layer resin to the supply port 28 from the resin supply unit B. By doing so, the molten main resin passes along the hot runner 27 and the introduction channel 21 and then, is divided by the manifolds 22 and 23 to be introduced to the inner flow channel 15 and the outer flow channel 17. On the other hand, when the check valve 30 is open, the molten intermediate layer resin passes along the hot runner 29 and the introduction channel 24 and then, is introduced to the middle flow channel 16 through the manifold 25.

Herein, as illustrated in FIG. 4, the side wall's upstream portions 20*b* included in each vertical blocking rib piece 20 disposed in the middle flow channel 16 are formed as the angled surfaces having a width between each other decreasing on the upstream side (i.e., on the outer side of the inner ring mandrel 12 in the radial direction). This structure allows the flow of the molten intermediate layer resin, which is supposed to flow along the middle flow channel 16 from the upstream side to the downstream side (i.e., from the outer side to the inner side of the inner ring mandrel 12 in the radial direction), to progress without being interrupted by the vertical blocking rib pieces 20. Any built-up of the molten resin within the injection molding device might cause resin burning (carbonization), and the carbonized resin might get mixed in the preform as impurities. Furthermore, when adhering to the vertical blocking rib pieces 20 and so forth, the carbonized resin narrows the middle flow channel 16. In this case, the resulting intermediate layer and vertical connecting zones might not achieve the desired dimensions. However, thus forming the side wall's upstream portions 20*b* as the angled surfaces prevents these troubles effectively.

Furthermore, as illustrated in FIG. 4, the side clearance s between the side wall's downstream portions 20*c* included in any two adjacent vertical blocking rib pieces 20 is constant from the upstream side to the downstream side. This structure allows the intermediate layer resin to flow between the side wall's downstream portions 20*c*, thereby stabilizing a flow range (width) of the intermediate layer resin.

Figure 10A:
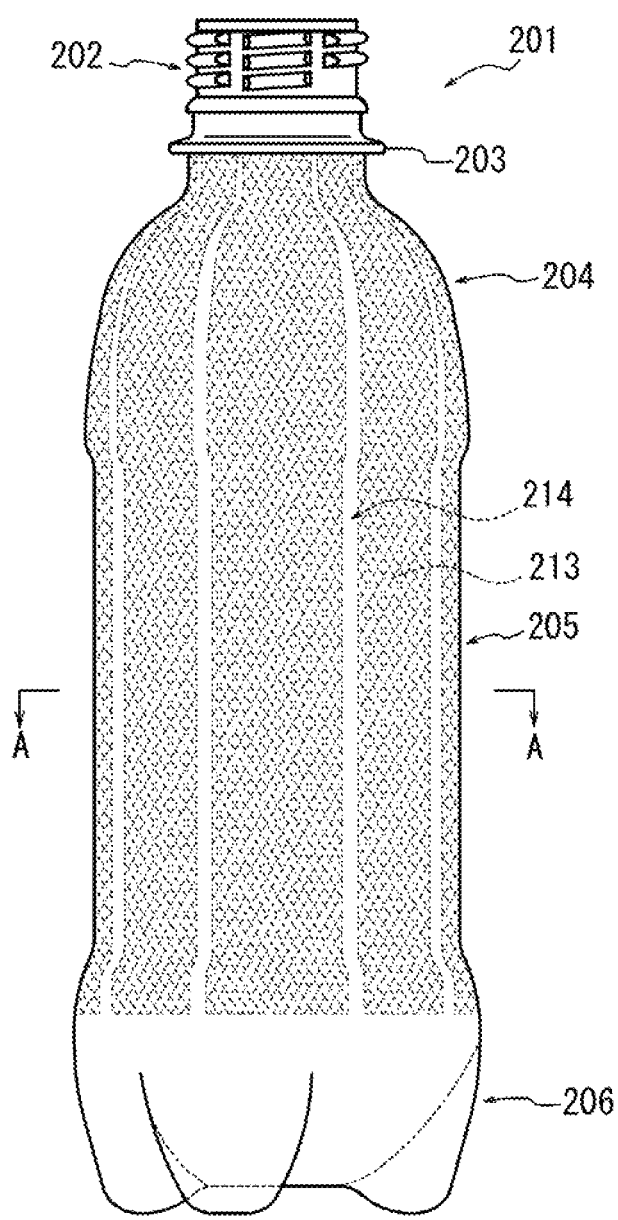
FIG. 10A is a front view illustrating an exemplary laminated bottle according to Patent Literature 2.
Figure 10B:
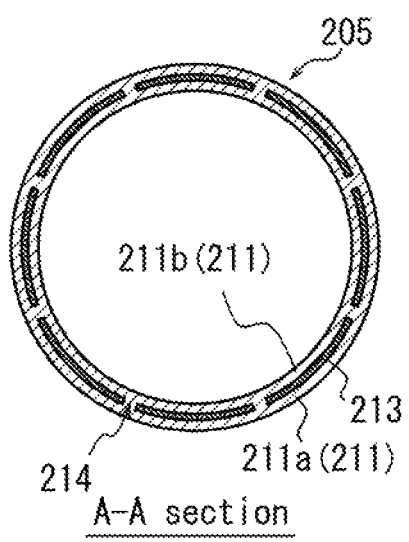
FIG. 10B is a sectional view of the laminated bottle taken along a line A-A in FIG. 10A.
Figure 11A:
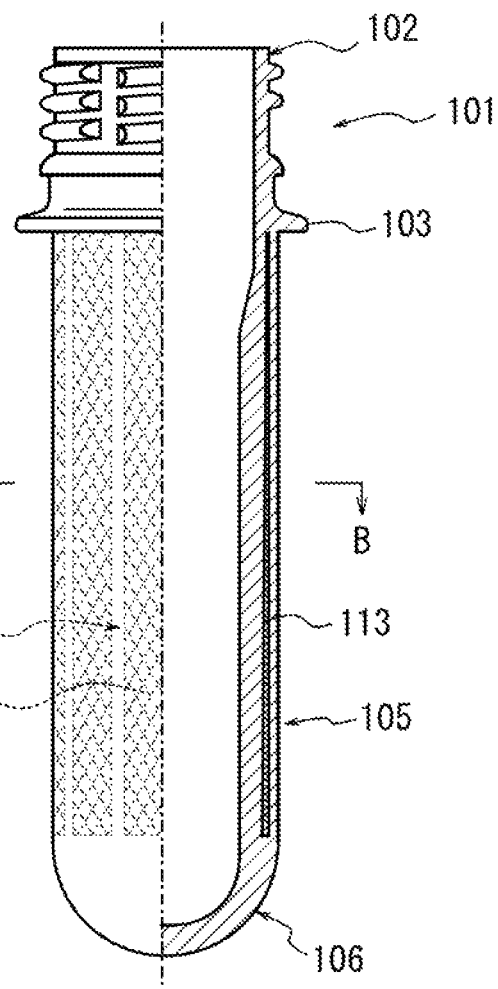
FIG. 11A is a half sectional view illustrating a preform used to mold the laminated bottle of FIGS. 10A and 10B, as viewed from front.
Figure 11B:
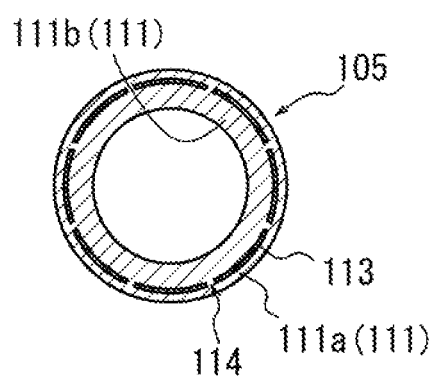
FIG. 11B is a sectional view of the preform taken along a line B-B in FIG. 11A.

Then, as illustrated in FIG. 1, after being segmented into eight streams in the circumferential direction, the intermediate layer resin flows between the main resin from the inner flow channel 15 and the main resin from the outer flow channel 17 at the confluence 18, where the intermediate layer resin is laminated coaxially between the main resin layers over a predetermined time range to form a multi-layer molten resin fluid. The multi-layer molten resin fluid is injected and filled into a cavity of the mold which is not illustrated. Since supply of the intermediate layer resin may be switched between start and stop immediately with high precision simply by opening and closing the check valve 30, the intermediate layer is laminated in a predetermined range extending right below the lower end of the neck ring to the upper end of the bottom as illustrated in FIG. 10A, by starting supply of the intermediate layer resin a predetermined time period later than a starting time of supply of the main resin, and by stopping supply of the intermediate layer resin a predetermined time period earlier than a stopping time of supply of the main resin. However, the range over which the intermediate layer is laminated is not limited to the example of FIG. 10A.

Figure 5:
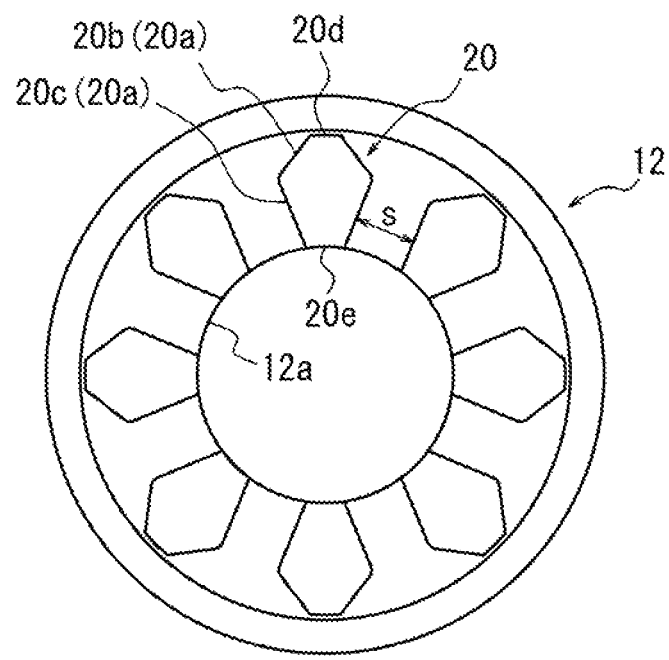
FIG. 5 is a bottom view illustrating, similarly to FIG. 4, a modified example of the inner mandrel according to the first embodiment.

Additionally, although in the example of FIG. 4 the side wall's upstream portions 20*b* included in each vertical blocking rib piece 20 are connected to form an acute angle therebetween, the vertical blocking rib piece 20 may further include an outer wall portion 20*d* located between the side wall's upstream portions 20*b* on the outer side in the radial direction as illustrated in FIG. 5. Furthermore, the vertical blocking rib piece 20 may also be disposed on the inner surface of the middle ring mandrel 13 instead of the inner ring mandrel 12.

The following describes an injection molding device according to the second embodiment of the present disclosure with reference to FIG. 6. As illustrated in FIG. 6, in the second embodiment, an inner circumferential end 13*a* of the middle ring mandrel 13 is located on the outer side of an inner circumferential end 20*e* of each vertical blocking rib piece 20 in the radial direction (i.e., the inner circumferential end 13*a* is located on the upstream side of the inner circumferential end 20*e* of the vertical blocking rib piece 20 in the outer flow channel 17). Besides, the inner circumferential end 13*a* is in contact with the vertical blocking rib piece 20. Thus, a downstream side end portion of the vertical blocking rib piece 20 that extends from the inner circumferential end 13*a* to the inner circumferential end 20*e* is tucked in the outer flow channel 17. Meanwhile, in the first embodiment, the inner circumferential end 13*a* is aligned with the inner circumferential end 20*e* in the radial direction.

To mold a preform by using the injection molding device according to the second embodiment, one may similarly introduce the molten main resin to the supply port 26 from the resin supply unit A and introduce the molten intermediate layer resin to the supply port 28 from the resin supply unit B as illustrated in FIG. 1. By doing so, as illustrated in FIG. 6, the main resin is introduced to the inner flow channel 15 and the outer flow channel 17, and the intermediate layer resin is introduced to the middle flow channel 16. Arrows designated by reference numerals a, b, and c in FIG. 6 respectively represent flow of the main resin in the inner flow channel 15, flow of the intermediate layer resin in the middle flow channel 16, and flow of the main resin in the outer flow channel 17.

Similarly to the first embodiment, after being segmented into eight streams in the circumferential direction by the vertical blocking rib pieces 20, the intermediate layer resin b flows toward the confluence 18 as illustrated in FIG. 6. At this time, since in the second embodiment the end portion of each vertical blocking rib piece 20 that is located on the downstream side is tucked in the outer flow channel 17, each stream of the intermediate layer resin b resulting from the segmentation by the vertical blocking rib pieces 20 flows under the guidance of adjacent vertical blocking rib pieces 20 even after joining with the main resin c flowing along the outer flow channel 17. This allows the stream of the segmented intermediate layer resin b to flow into the confluence 18 in a stable manner, and accordingly, at the joining flow channel 19, there is formed the multi-layer molten resin fluid having an intended lamination configuration further including the main resin a flowing along the inner flow channel 15. Additionally, when the vertical blocking rib piece 20 is tucked in the outer flow channel 17 to too much of an extent, the vertical blocking rib piece 20 will interrupt flow of the molten resins. Accordingly, as illustrated in FIG. 6, a height difference h between the inner circumferential end 13a of the middle ring mandrel 13 and the inner circumferential end 20e of the vertical blocking rib piece 20 is preferably set in the range approximately from 0.7 mm to 1.0 mm. Subsequently, similarly to the first embodiment, the multi-layer molten resin fluid is injected and filled into a cavity of the mold which is not illustrated, and thus, the preform is molded.

The injection molding device according to the present disclosure is not limited to the above embodiments and may include many variations. For example, although in the above embodiments the vertical blocking rib pieces 20 are disposed in the tapered portion of the inner ring mandrel 12, the vertical blocking rib pieces 20 may be further extended toward the upstream side even to the cylindrical outer circumferential surface of the inner ring mandrel 12.

Figure 8:
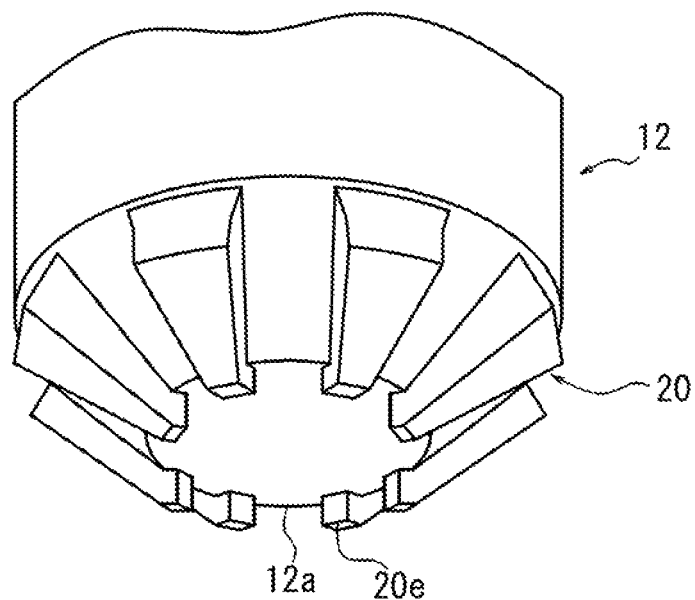
FIG. 8 is a perspective view illustrating an inner ring mandrel of the injection molding device of FIG. 7 as viewed from a downstream side.
Figure 9:
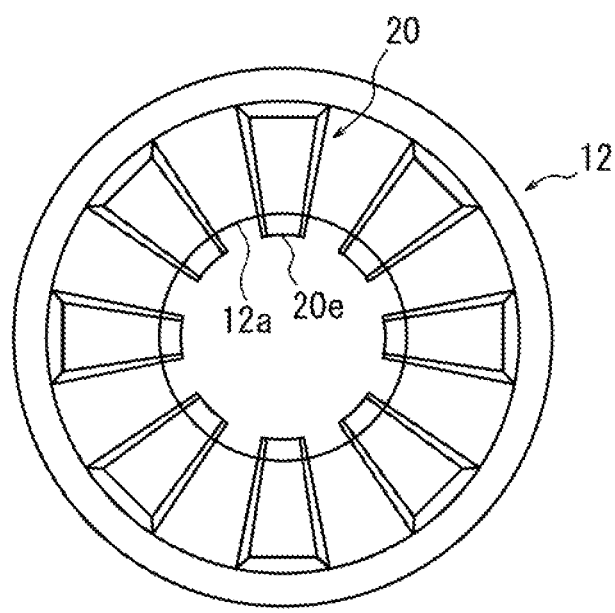
FIG. 9 is a bottom view illustrating the inner ring mandrel of the injection molding device of FIG. 7 as viewed from the downstream side.

Furthermore, as illustrated in FIG. 7, the end portion of each vertical blocking rib piece 20 that is located on the downstream side may be tucked only in the inner flow channel 15, not in the outer flow channel 17 as illustrated in FIG. 6. In more detail, as illustrated in FIGS. 8 and 9, the inner circumferential end 20e of the vertical blocking rib piece 20 may extend to a position located on the inner side of an opening edge 12a of the inner ring mandrel 12 in the radial direction. That is to say, the downstream side end portion of the vertical blocking rib piece 20 that extends from the opening edge 12a of the inner ring mandrel 12 to the inner circumferential end 20e of the vertical blocking rib piece 20 may be tucked in the inner flow channel 15. This structure allows each stream of the intermediate layer resin b to flow under the guidance of adjacent vertical blocking rib pieces 20 even after joining with the main resin a flowing along the inner flow channel 15. Accordingly, at the joining flow channel 19, there is formed the multi-layer molten resin fluid having an intended lamination configuration further including the main resin c flowing along the outer flow channel 17. Moreover, the end portion of each vertical blocking rib piece 20 that is located on the downstream side may be tucked in both the outer flow channel 17 and the inner flow channel 15, by combining the structures of FIGS. 6 and 7. It is to be noted, however, that the inner ring mandrel 12 of FIGS. 2 to 4 is superior in terms of strength because the vertical blocking rib piece 20 in the present embodiment is located on the inner side of the opening edge 12a of the inner ring mandrel 12 in the radial direction.

In the injection molding devices according to the first and second embodiments, the inner ring mandrel 12 may be coated with a repellency-enhancing film. Although the middle flow channel 16 is segmented into the narrow flow sub-channels by the vertical blocking rib pieces 20, use of the film prevents built-up of the molten resin in the flow channel, thereby reducing occurrence of resin burning effectively. Preferred examples of the repellency-enhancing film include a titanium nitride (TiN) film and a NiP/PTFE film containing nickel phosphide (NiP) and polytetrafluoroethylene (PTFE). Especially, a TiN film is superior in terms of durability due to its higher hardness compared with a NiP/PTFE film. As a base material of the inner ring mandrel 12, stainless is preferably used. Although the middle flow channel 16, having been narrowed by the vertical blocking rib pieces 20, is subject to high pressure while the molten resin flows therein, stainless provides excellent durability due to its high hardness.

EXAMPLES

The same inner ring mandrels as the inner ring mandrel illustrated in FIGS. 2 to 4, except for that the films were changed, were prepared. The prepared inner mandrels were each assembled to the injection molding device of FIG. 1. Then, a relation between the film of the inner ring mandrel and resin burning was studied by letting the resin build up in the nozzle section included in the injection molding device. Stainless (SUS304) was used as the base material of the inner ring mandrel. A PET resin was used as the main resin, and MX nylon (MXD-6 manufactured by Mitsubishi Gas Chemical Co., Inc.) was used as the intermediate layer resin. After the temperature in the nozzle section was set in the range from 270° C. to 280° C. and after the resin built up for one hour, a predetermined amount of the resin built-up was ejected (purged). Subsequently, a preform was molded while the intermediate layer and the vertical connecting zones were observed. Then, assessment was conducted on the preforms molded as above and a control preform which included the intermediate layer and the vertical connecting zones which were properly formed. Table 1 shows results of the assessment, together with variations of the film used in the inner ring mandrels.

TABLE 1

| Film of inner ring mandrel | Condition of intermediate layer and vertical connecting zones included in preform |
| --- | --- |
| No film | Unsatisfactory |
| Hard chrome film | Moderately satisfactory |
| TiN film | Satisfactory |
| NiP/PTFE film | Satisfactory |

Satisfactory: No deformation (e.g., reduction in thickness, presence of missing part) is observed (the result being equivalent to that of the control preform)
Moderately satisfactory: Deformation is obsrved (although the extent of deformation is limited)
Unsatisfactory: Deformation is observed (and the extent of deformation is large)

After molding of each preform, the nozzle section was disassembled to observe the inner ring mandrel. A foreign substance, which appeared to be the carbonized resin, was found adhered between adjacent vertical blocking rib pieces (i.e., flow sub-channels of the intermediate layer resin) both in the inner mandrel that is not coated with a film and the inner ring mandrel coated with the hard chrome film. On the other hand, no such foreign substance was found adhered in the inner ring mandrel coated with the TiN film and the inner ring mandrel coated with the NiP/PTFE film. Thus, the inner ring mandrel coated with the TiN film and the inner ring mandrel coated with the NiP/PTFE film are considered to be capable of preventing occurrence of carbonization of the resin, or, capable, even when carbonization of the resin occurs, of allowing the carbonized resin to be eliminated by ejection (purging). The results of observation of the inner ring mandrels and the results shown in Table 1 clearly indicate that, with use of the inner ring mandrel coated with the TiN film and the inner ring mandrel coated with the NiP/PTFE film, the intermediate layer and the vertical connecting zones may be formed into desired shapes and dimensions.

Additionally, a repellency-enhancing film may be applied not only to the inner ring mandrel but also to the middle ring mandrel and the outer ring mandrel. Especially, applying a film to the middle ring mandrel, which forms the middle flow channel between itself and the inner ring mandrel, will facilitate flow of the intermediate layer resin, and accordingly, it is better ensured that deformation of the intermediate layer due to occurrence of resin burning will be prevented.

Furthermore, although in the above embodiments the nozzle section is configured to form a preform having a lamination configuration including the three layers made of the two different types of resins, a preform having any different lamination configuration, including four layers made of the two different types of resins, and four layers made of three different types of resins, may be formed by providing the nozzle section with an additional flow channel as needed. Moreover, the number of the vertical blocking rib pieces 20 may be changed appropriately in accordance with a desired number of the vertical connecting zones, and only a single and not a plurality of vertical blocking rib piece may also be disposed. Moreover, the first embodiment and the second embodiment may be combined.

INDUSTRIAL APPLICABILITY

The injection molding device according to the present disclosure allows formation of the intermediate layer having a desired shape and dimension even when preform injection molding is conducted successively. Accordingly, preforms of excellent quality are molded, and moreover, production efficiency is improved because of reduced clogging in the nozzle section.

REFERENCE SIGNS LIST 1 nozzle section
2 hot runner block
11 shut-off pin
12 inner ring mandrel
12a opening edge
13 middle ring mandrel
13a inner circumferential end
14 outer ring mandrel
15 inner flow channel
16 middle flow channel
17 outer flow channel
18 confluence
19 joining flow channel
20 vertical blocking rib piece
20a side wall
20b side wall's upstream portion
20c side wall's downstream portion
20d outer wall portion
20e inner circumferential end
21 introduction channel
22, 23 manifold
24 introduction channel
25 manifold
26 supply port
27 hot runner
28 supply port
29 hot runner
30 check valve
A resin supply unit
B resin supply unit
a flow of main rein in inner flow channel
b flow of intermediate layer rein in middle flow channel
c flow of main rein in outer flow channel
h height difference between inner circumferential end of middle ring mandrel and inner circumferential end of vertical blocking rib piece
s side clearance
101 preform
102 neck
103 neck ring
105 body
106 bottom
111 substrate layer
111a outer layer
111b inner layer
113 intermediate layer
114 vertical connecting zone
201 bottle
202 neck
203 neck ring
204 shoulder
205 body
206 bottom
211 substrate layer
211a outer layer
211b inner layer
213 intermediate layer
214 vertical connecting zone
301 mold
311 nozzle section
315 inner flow channel
316 middle flow channel
316R vertical blocking rib piece
317 outer flow channel
318 confluence
319 joining flow channel
320 shut-off pin
324c inner ring mandrel
324d middle ring mandrel
324e outer ring mandrel

The invention claimed is:

1. An injection molding device that injection molds a preform which is subject to biaxial stretch blow molding and which includes at least one intermediate layer laminated between substrate layers, the injection molding device including a nozzle section through which a main resin used to form the substrate layers and an intermediate layer resin used to form the intermediate layer are injected, the nozzle section including at least three cylindrical layer-forming flow channels disposed coaxially, the three cylindrical layer-forming flow channels including an inner flow channel and an outer flow channel, which are used to form the substrate layers each made of the main resin, and a middle flow channel, which is located between the inner flow channel and the outer flow channel and is used to form the intermediate layer made of the intermediate layer resin, and the middle flow channel being segmented into a predetermined number of flow sub-channels by at least one vertical blocking rib piece disposed transversely within the middle flow channel on a downstream side thereof, wherein (i) the vertical blocking rib piece has a pair of side walls located on both sides of the vertical blocking rib piece in a circumferential direction, and the pair of side walls each include a side wall's upstream portion located on an upstream side, the side wall's upstream portions being formed as angled surfaces whose distance from each other decreases from the downstream side to the upstream side, and/or (ii) an end portion of the vertical blocking rib piece that is located on the downstream side is tucked in at least one of the inner flow channel and the outer flow channel.

2. The injection molding device of claim 1, wherein the at least one vertical blocking rib piece comprises a plurality of vertical blocking rib pieces, and the pair of side walls each further include a side wall's downstream portion located on the downstream side, and a side clearance between the side wall's downstream portions included in any two adjacent vertical blocking rib pieces is constant from the upstream side to the downstream side.

3. The injection molding device of claim 1, wherein the end portion of the vertical blocking rib piece that is located on the downstream side is tucked at least in the outer flow channel.

4. The injection molding device of claim 1, wherein (i) the vertical blocking rib piece has the pair of side walls located on both sides of the vertical blocking rib piece in the circumferential direction, and the pair of side walls each include the side wall's upstream portion located on the upstream side, the side wall's upstream portions being formed as angled surfaces whose distance from each other decreases from the downstream side to the upstream side, and (ii) the end portion of the vertical blocking rib piece that is located on the downstream side is tucked in at least one of the inner flow channel and the outer flow channel.

5. The injection molding device of claim 1, wherein
the nozzle section includes an inner ring mandrel including inside thereof the inner flow channel, a middle ring mandrel surrounding the inner ring mandrel and including the middle flow channel between the middle ring mandrel and the inner ring mandrel, and an outer ring mandrel surrounding the middle ring mandrel and including the outer flow channel between the outer ring mandrel and the middle ring mandrel, and
at least the inner ring mandrel is coated with a repellency-enhancing film.

6. The injection molding device of claim 5, wherein the film applied to the inner ring mandrel comprises a titanium nitride (TiN) film or a NiP/PTFE film containing nickel phosphide (NiP) and polytetrafluoroethylene (PTFE).

7. The injection molding device of claim 5, wherein a base material of the inner ring mandrel comprises stainless.

* * * * *